(12) United States Patent
Elmaleh

(10) Patent No.: US 7,105,958 B1
(45) Date of Patent: Sep. 12, 2006

(54) ELECTRO-MAGNETIC ENGINE

(76) Inventor: Shimon Elmaleh, 7425 SW. 109 Ter., Pinecrest, FL (US) 33156

( * ) Notice: Subject to any disclaimer, the term of this patent is extended or adjusted under 35 U.S.C. 154(b) by 119 days.

(21) Appl. No.: 10/987,701

(22) Filed: Nov. 15, 2004

(51) Int. Cl.
*H02K 33/00* (2006.01)

(52) U.S. Cl. .............................. 310/24; 310/34; 310/35

(58) Field of Classification Search ............ 310/32–35, 310/24
See application file for complete search history.

(56) References Cited

U.S. PATENT DOCUMENTS

| | | | | |
|---|---|---|---|---|
| 3,676,719 A | * | 7/1972 | Pecci | 310/24 |
| 4,012,675 A | * | 3/1977 | Schulze, Jr. | 318/37 |
| 4,317,058 A | * | 2/1982 | Blalock | 310/24 |
| 4,510,420 A | * | 4/1985 | Sasso | 318/37 |
| 4,631,455 A | * | 12/1986 | Taishoff | 318/37 |
| 4,749,893 A | * | 6/1988 | Reynolds | 310/24 |
| 5,219,034 A | * | 6/1993 | Wortham | 180/65.3 |
| 5,457,349 A | * | 10/1995 | Gifford | 310/24 |
| 5,469,004 A | * | 11/1995 | Jachim | 310/24 |
| 5,592,036 A | * | 1/1997 | Pino | 310/24 |
| 6,278,204 B1 | * | 8/2001 | Frenette | 310/24 |

\* cited by examiner

*Primary Examiner*—Burton Mullins
(74) *Attorney, Agent, or Firm*—Albert Bordas

(57) ABSTRACT

An electro-magnetic engine in which the motive force is electro-magnetism. The electro-magnetic engine comprises a housing structure, cylinder assembly, crankcase assembly, crankshaft assembly, electro-magnetism system and an electrical system. The electro-magnetism system consists of a coil assembly arranged stationary in the housing. The electro-magnetic engine includes the rotation of the crankshaft in a predetermined direction continuously after the initial activation of the crankshaft by assembly of applying a short period of the external force, such as from an automobile starter. At least three alternators are connected to the rotating crankshaft and work at 35 amps each to recharge batteries.

1 Claim, 4 Drawing Sheets

ELECTRO-MAGNETIC ENGINE

BACKGROUND OF THE INVENTION

1. Field of the Invention

The present invention relates to engines, and more particularly, to an engine in which the motive force is electro-magnetism.

2. Description of the Related Art

Electromagnetic systems comprise the basic principle that opposite poles attract and like poles repel each other. There are no electro-magnetic engines to the best of applicant's knowledge that include the rotation of a crankshaft in a predetermined direction continuously after the initial activation of the crankshaft by means of applying a short period of a force, such as from an automobile starter.

SUMMARY OF THE INVENTION

An electro-magnetic engine, comprising a housing structure and cylinder means. The cylinder means comprises at least two cylinders that are encased with in the housing structure. Each cylinder means includes a piston and a piston rod. The piston has first and second ends. The first end has a magnetic body and the second end connects to the piston rod.

The electro-magnetic engine further comprises crankcase means and crankshaft means. The crankcase means is affixed to the housing structure. The crankshaft means is positioned in the crankcase means. The piston rod is assembled to the crankshaft means in the crankcase means. The electro-magnetic engine further comprises electro-magnetic means. The electro-magnetic means consists of coil means having at least two coils. Each of the at least two coils are arranged stationary in the housing structure and are aligned with its respective piston. Each of the at least two coils have first and second openings. The first and second openings include winding terminals electrically connected to a distributor. The distributor has synchronizing means to send an electrical current to the at least two coils to switch magnetic polarity. The electro-magnetic means generates an electromotive force between the first and second openings and its corresponding magnetic body when synchronized by the distributor, wherein switching the magnetic polarity between the first and second openings forces the piston to move upward and downward within its respective at least two cylinders. This causes the rotation of the crankshaft means in a predetermined direction continuously after the initial activation of the crankshaft means, by applying a short period of a force. The electro-magnetic means are affixed to the housing structure.

The electro-magnetic engine further comprises electrical means comprising an electrical connection and a source of battery power for supplying battery power for the short period of a force. The electrical means further comprises the source of battery power having the electrical connection to a starter switch. The starter switch has an electrical connection to a starter. The starter switch has an electrical connection to at least one electrical coil. The electrical coil, as an inverter, has means to convert 24 volts to 240 volts. The at least one electrical coil has an electrical connection to a mechanical pedal. The mechanical pedal has an electrical connection to an electric accelerator and the computer, and the computer has an electrical connection to the distributor.

In the preferred embodiment, the force derives from an automobile starter, the magnetic body includes a permanent magnet or electro-magnet, and the at least two coils contains permeable material or an air core.

It is one of the main objects of the present invention to provide an electro-magnetic engine in which the motive force is electro-magnetism.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
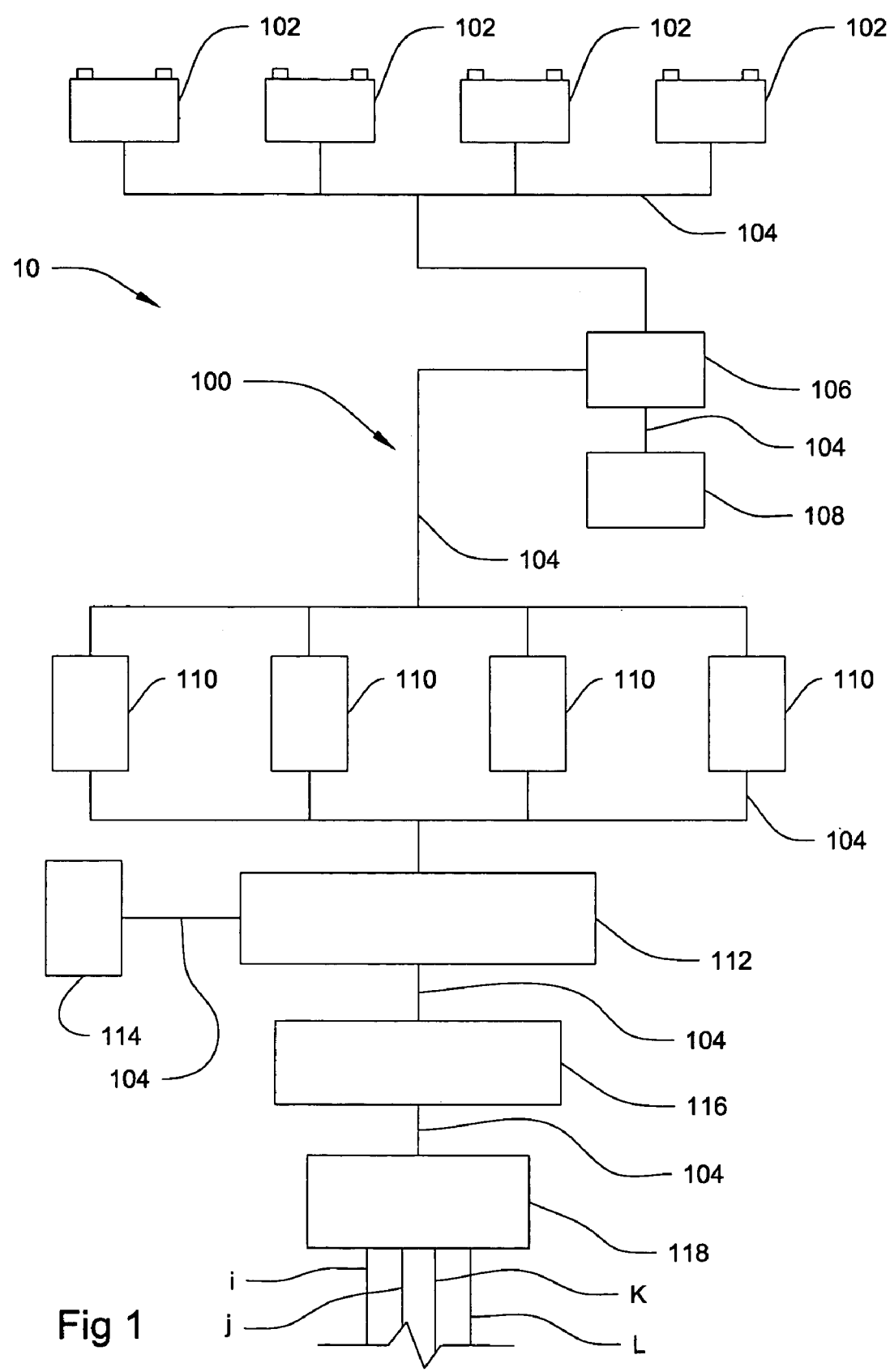
FIG. 1 is a schematic drawing showing a section of the electrical system of a four cylinder electro-magnetic engine.

Referring now to the drawings, an electro-magnetic engine is shown at 10. In the preferred embodiment, the electro-magnetic engine consists of two or more cylinders and associated mechanisms assembled with it as described in this invention within a housing. It can be observed that it basically includes cylinder assemblies 20, 20', 20", 20''', crankcase assembly 30, electro-magnetism assembly 40, and electrical system 100. Only a portion of the cylinder assemblies 20, 20', 20", 20''' and crankcase assembly 30 are shown in order to describe the invention. Cylinder assemblies 20, 20', 20", 20''' are constructed in a suitable housing means to which crankcase assembly 30 is attached. A typical piston 24, piston rod 26, and crankshaft 34 are illustrated assembled within cylinder 22 and crankcase 32.

As seen in FIG. 1, electrical system 100 comprises rechargeable batteries 102 and electrical wires 104 that electrically connect to each of the components described below. Rechargeable batteries 102 have sufficient power to start instant invention 10. Each of rechargeable batteries 102 has an electrical wire 104 that connects to starter switch 106. Starter switch 106 is connected to starter 108. Starter switch 106 connects to each of electrical coils 110 with electrical wire 104. In the preferred embodiment, each of electrical coils 110, as inverters, have means to convert 24 volts to 240 volts. Electrical coils 110 connect to a mechanical pedal 112 that connects to an electric accelerator 114. The mechanical pedal 112 is operated by a driver whereby pressing the mechanical pedal 112 increases vehicle acceleration. Recognizing pedal placement, electric accelerator 114 communicates electronically with computer 116, and computer 116 determines current to flow to distributor 118. Extending from distributor 118 are electrical wires i, j, k, and l. It is also noted that distributor 118 has a connection, not shown, to crankshaft 34 for establishing timing. Furthermore, distributor 118 has synchronizing means to send an electrical current to coils 42, 42', 42" and 42''', seen in FIG. 1a, to switch magnetic polarity.

Figure 1A:
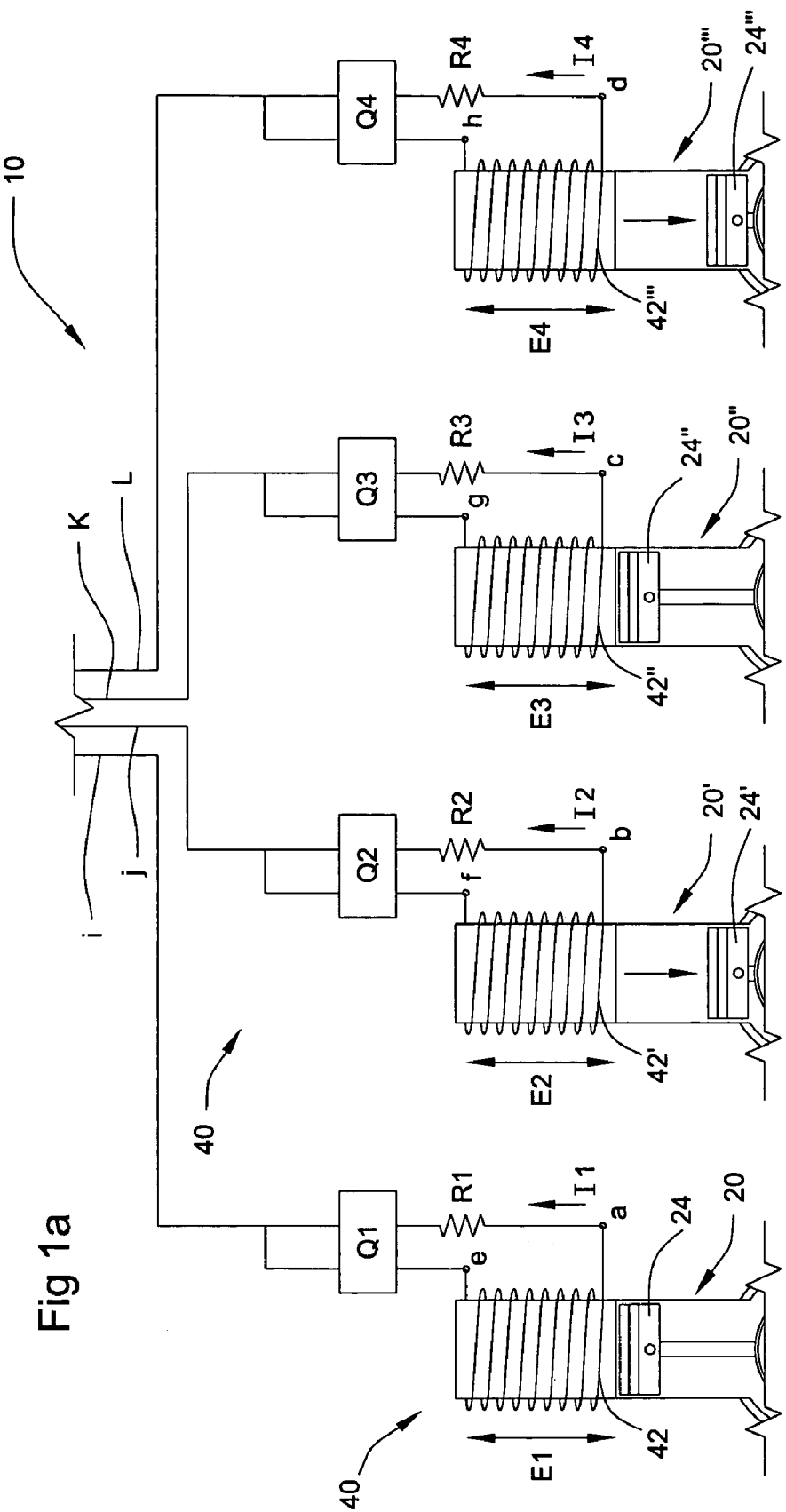
FIG. 1a is a structural schematic drawing showing the vertical cross section through each piston, cylinder head, and the electro-magnetism assembly of the four cylinder electro-magnetic engine.

A typical cylinder and associated mechanisms of an electro-magnetic engine is portrayed in FIG. 1a as provided in this invention. Seen in the present illustration is a structural schematic drawing showing the vertical cross section through each piston, cylinder head, and the electro-magnetism assembly of a four cylinder electro-magnetic engine, wherein cylinder assemblies 20 and 20" illustrate their respective pistons 24 and 24" in the position of top dead center and cylinder assemblies 20' and 20''' illustrate their respective pistons 24'and 24''' in the position of bottom dead center.

In the illustrated embodiment, the electro-magnetism assembly 40 comprises coils 42, 42', 42" and 42''' for pistons 24, 24', 24" and 24''' respectively. Coils 42, 42', 42" and 42''' are stationary and are positioned in an aligned manner with cylinder assemblies 20, 20', 20", and 20''' respectively. As shown in this figure, four winding terminals a, b, c, and d are located respectively at the opening of coils 42, 42', 42" and 42''' respectively, and the other four winding terminals e, f, g and h are located at the other opening of each coil 42, 42', 42" and 42''' respectively.

In the illustrated four cylinder electro-magnetic engine, pistons 24 and 24" have completed their respective travel in the upward direction to the position of top dead center within cylinder assemblies 20 and 20" respectively. As pistons 24 and 24" approach the end of coils 42 and 42" respectively, as seen in this illustration, coils 42 and 42" induce electromotive forces E1 and E3 and induce currents I1 and I3 respectively.

The induced currents I1 and I3 flow through their respective current limiters R1 and R3 and activate transistors Q1 and Q3 respectively. When the transistors Q1 and Q3 are activated, the currents I1 and I3 flow to distributor 118. Distributor 118 synchronizes the generation of opposite forces by sending an electrical current to switch magnetic polarity to coils 42 and 42" (i.e., an opposite electromotive force) so as to force the pistons 24 and 24" respectively moving upward and downward.

Similarly, electromotive forces E2 and E4 can also be induced with coils 42' and 42''' by pistons 24' and 24''' that induce currents I2 and I4 respectively. The induced currents I2 and I4 flow through their respective current limiters R2 and R4 and activate transistors Q2 and Q4 respectively. When the transistors Q2 and Q4 are activated, the currents I2 and I4 flow to distributor 118. Distributor 118 synchronizes the generation of opposite forces by sending an electrical current to switch magnetic polarity to coils 42' and 42''' (i.e., an opposite electromotive force) so as to force the pistons 24' and 24''' respectively moving upward and downward.

Forcing pistons 24, 24', 24" and 24''' upward and downward within their respective cylinder assemblies 20, 20', 20", 20''', rotates crankshaft 34, seen in FIGS. 2–5, in a predetermined direction continuously after the initial activation of the crankshaft 34. Initial activation of the crankshaft 34 can be accomplished by means of applying a short period of the force, such as from starter 108. At least three alternators, not shown, are connected to the rotating crankshaft 34. In the preferred embodiment, the alternators work at 35 amps each and recharge rechargeable batteries 102.

Figure 2:
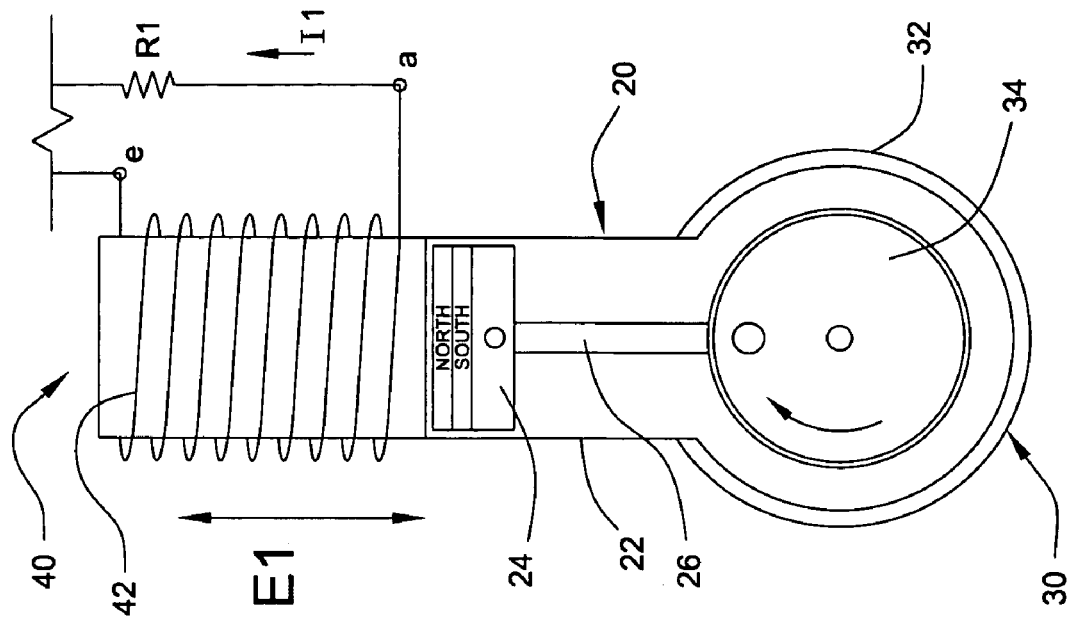
FIG. 2 is a structural schematic drawing showing a vertical cross section through the crankshaft, piston, cylinder head, and electro-magnetism assembly of the electro-magnetic engine on the upward stroke.

FIG. 2 illustrates piston 24 traveling in an upward direction. It is noted that piston 24 comprises a magnetic body having a permanent magnetic material defining a north and a south polarity as illustrated. Each of the magnetic bodies, in other pistons, has a same direction of a polarity. The direction of rotation of crankshaft 34 is shown in each of FIGS. 3 through 5. As shown in FIG. 2, piston 24 is attracted to coil 42.

Figure 3:
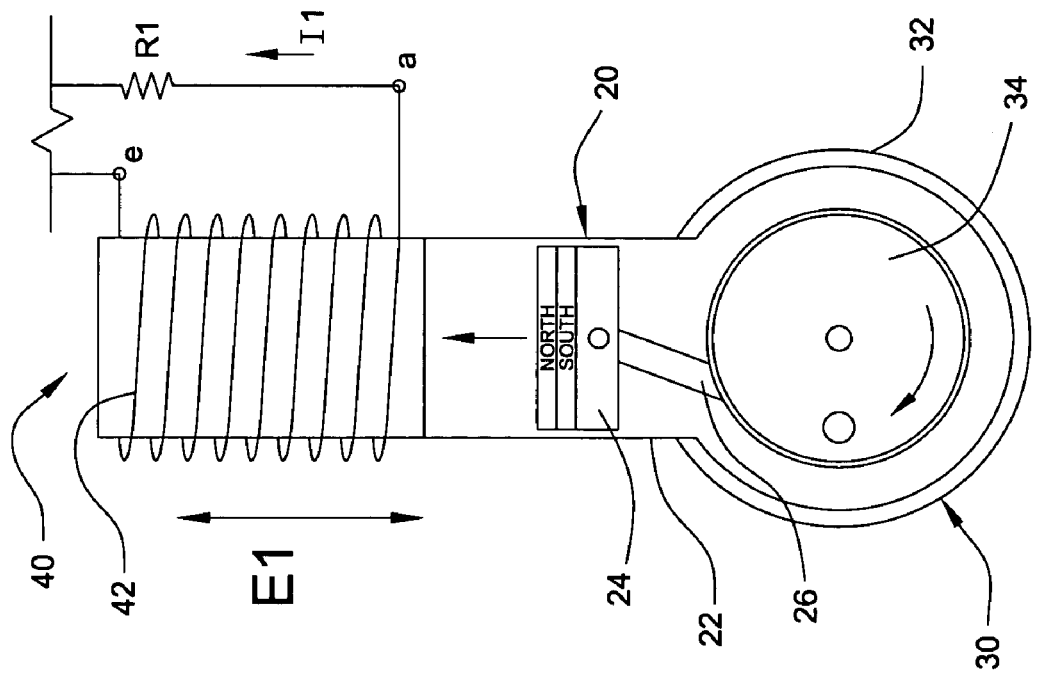
FIG. 3 is a structural schematic drawing showing the vertical cross section through the crankshaft, piston, cylinder head, and electro-magnetism assembly of the electro-magnetic engine on the upward stroke at top dead center.

As seen in FIG. 3 in cylinder assembly 20, piston 24 completed its travel in the upward direction to the position of top dead center. When piston 24 approaches the end of coil 42, as seen in this illustration, coil 42 induces an electromotive force E1.

Figure 4:
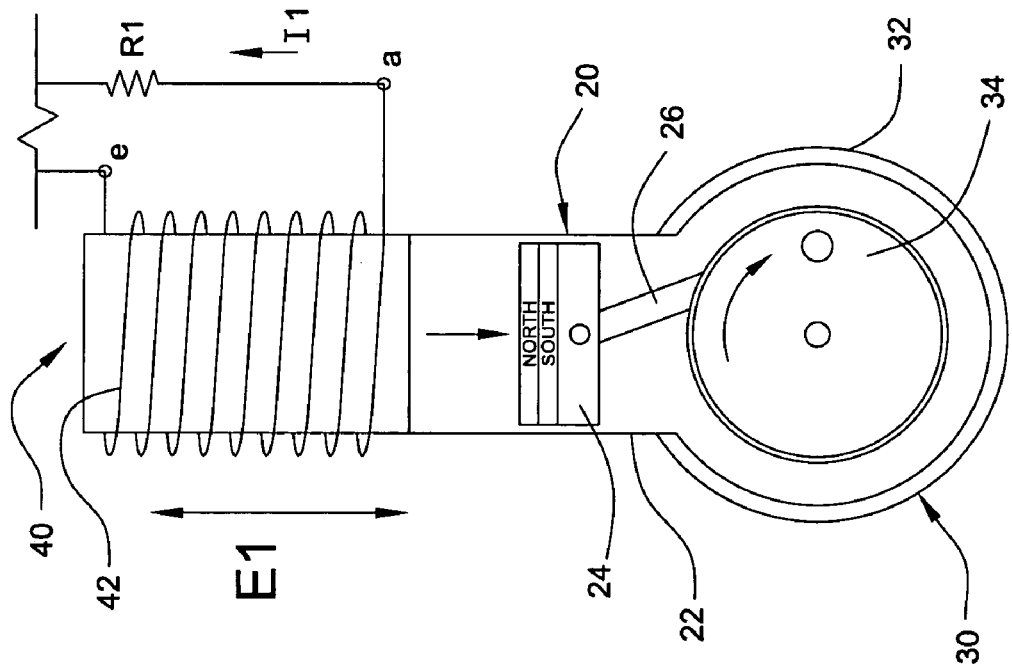
FIG. 4 is a structural schematic drawing showing the vertical cross section through the crankshaft, piston, cylinder head, and electro-magnetism assembly of the electro-magnetic engine on the downward stroke.

FIG. 4 illustrates piston 24 traveling in a downward direction in cylinder 22. As shown in this illustration, piston 24 is repelling from coil 42.

Figure 5:
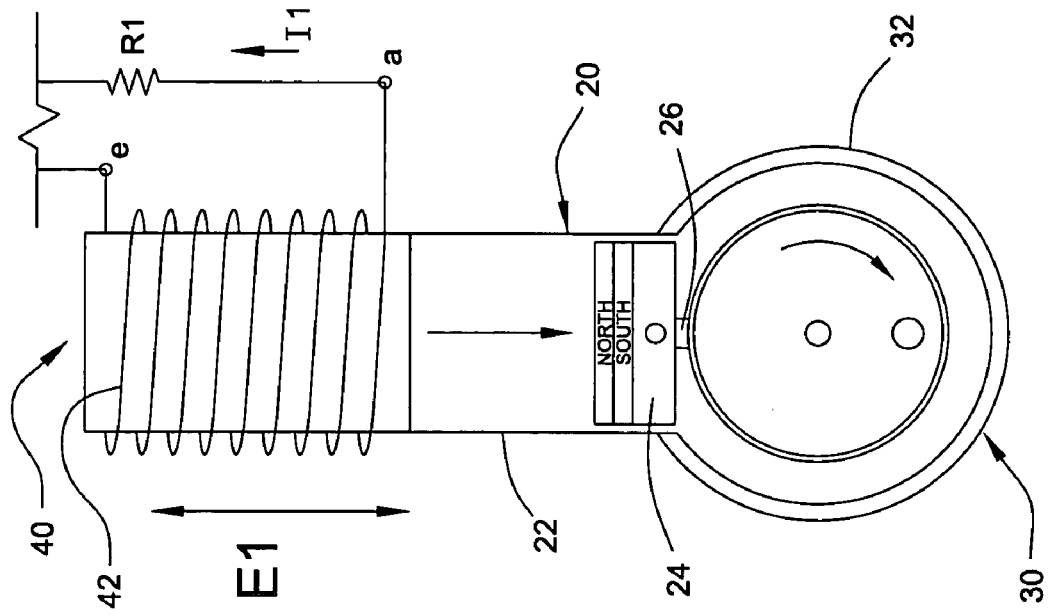
FIG. 5 is a structural schematic drawing showing the vertical cross section through the crankshaft, piston, cylinder head, and electro-magnetism assembly of the electro-magnetic engine on the downward stroke at bottom dead center.

As seen in FIG. 5, piston 24 continues to travel in the downward direction to the position of bottom dead center.

It is noted that the electro-magnetic engine also comprises a water-pump system for cooling coils 42, 42', 42" and 42''' and an engine oil system for lubrication and cooling that have not been illustrated for simplification. In addition, it is noted that electro-magnetic engine 10 is manufactured of demagnetized material.

Furthermore, it is noted that cylinder assembly layout may change, wherein the instant invention may also work as a rotary type engine. This invention is suitable to be used with an automobile in the preferred embodiment; however, other embodiments of the present invention may be suitable for vehicles such as, but not limited to, trucks, jeeps, motorcycles, scooters, vans, and water vessels. Traditional components such as timing chains, gears etc. have not been depicted. It is understood that these components will be part of the final embodiment. The electro-magnetic engine may consist of two or more cylinders and necessary mechanisms constructed of suitable materials as described in this invention. Only a portion of the mechanism means has been illustrated enough to describe the invention, it is to be understood that variation in these elements of structure to obtain the same results is within the scope of the invention. In addition, it is important to note that the instant invention 10 requires scheduled maintenance and replacement of electro-magnetism assembly 40 at predetermined time intervals to maintain predetermined electromotive forces to properly operate.

In alternative embodiments, the instant invention may be implemented in electrical plants to produce electricity.

As can be readily understood from the foregoing description of the invention, the present structure can be configured in different modes to provide the ability to construct an electro-magnetic engine. Accordingly, the foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electro-magnetic engine, comprising;
A) a housing structure;
B) cylinder means, said cylinder means comprising at least two cylinders being encased in said housing structure and each including a piston and a piston rod, said piston having first and second ends, said first end having a magnetic body and said second end connected to said piston rod;
C) crankcase means, said crankcase means being affixed to said housing structure;
D) crankshaft means, said crankshaft means being positioned in said crankcase means, said piston rod being assembled to said crankshaft means in said crankcase means;
E) electro-magnetic means, said electro-magnetic means consisting of coil means having at least two coils, each of at least two coils arranged stationary in said housing structure aligned with its respective said piston, each of at least two coils having first and second openings, said first and second openings include winding terminals electrically connected to a distributor, said distributor having synchronizing means to send an electrical current to said at least two coils to switch magnetic polarity, said electro-magnetic means generate an electromotive force between said first and second openings, and its corresponding said magnetic body when synchronized by said distributor, wherein switching said magnetic polarity between said first and second openings forces said piston to move upward and downward within its respective said at least two cylinders thus rotating said crankshaft means in a predetermined direction continuously after the initial activation of said crankshaft means by applying a short period of an electrical force, said electro-magnetic means being affixed to said housing structure; and
F) electrical means comprising an electrical connection and a source of rechargeable battery power for supplying said rechargeable battery power for said short period of an electrical force, said electrical means further comprises said source of rechargeable battery power having said electrical connection to a starter switch, said starter switch has said electrical connection to a starter, said starter switch has said electrical connection to at least one electrical coil, said electrical coil is an inverter, and has means to convert 24 volts DC to 240 volts AC, said at least one electrical oil has said electrical connection to a mechanical pedal that is operated by a driver for acceleration, said mechanical pedal has said electrical connection to an electric accelerator, said mechanical pedal has said electrical connection to said computer, said computer has said electrical connection to said distributor, said short period of an electrical force derives from an automobile starter, said magnetic body includes a permanent magnet or electro-magnet, said at least two electrical coils contain permeable material or an air core, and as said piston approaches one of said at least two electrical coils, said at least two electrical coils include said electromotive force and said induced electrical current, induced said electrical current flows through current limiters and activates transistors, and when said transistors are activated, said electrical current flows to said distributor, said electrical means comprising at least three alternators, said alternators work at 35 amps each and recharge said rechargeable battery power.

* * * * *